United States Patent
Hodson et al.

(10) Patent No.: US 11,277,967 B2
(45) Date of Patent: Mar. 22, 2022

(54) HARVESTER TRANSPORT PREPARATION

(71) Applicant: Deere & Company, Moline, IL (US)

(72) Inventors: Michael J. Hodson, Silvis, IL (US);
Alex Brimeyer, Bettendorf, IA (US);
Yuriy Vladimirovic Gorodnikov,
Saarbruecken (DE)

(73) Assignee: DEERE & COMPANY, Moline, IL (US)

( * ) Notice: Subject to any disclaimer, the term of this patent is extended or adjusted under 35 U.S.C. 154(b) by 290 days.

(21) Appl. No.: 16/522,134

(22) Filed: Jul. 25, 2019

(65) Prior Publication Data

US 2021/0022288 A1    Jan. 28, 2021

(51) Int. Cl.
| | | |
|---|---|---|
| A01D 41/127 | (2006.01) | |
| A01D 41/14 | (2006.01) | |
| A01D 41/06 | (2006.01) | |

(52) U.S. Cl.
CPC ......... *A01D 41/1274* (2013.01); *A01D 41/06* (2013.01); *A01D 41/142* (2013.01); *A01D 41/145* (2013.01)

(58) Field of Classification Search
CPC .. A01D 41/1274; A01D 41/06; A01D 41/142; A01D 41/145
USPC ...................................................... 56/10.2 E
See application file for complete search history.

(56) References Cited

U.S. PATENT DOCUMENTS

| | | | |
|---|---|---|---|
| 4,409,780 A | 10/1983 | Beougher et al. | |
| 7,162,855 B2* | 1/2007 | Boeckmann | A01D 41/144 56/15.2 |
| 7,869,922 B2* | 1/2011 | Otto | A01D 41/145 701/50 |
| 9,125,343 B2 | 9/2015 | Duquesne et al. | |
| 9,763,385 B2* | 9/2017 | Digman | A01D 41/141 |
| 10,356,981 B2* | 7/2019 | Farley | A01D 34/04 |
| 10,405,481 B2* | 9/2019 | Chen | A01D 75/002 |
| 2009/0107094 A1* | 4/2009 | Bich | A01D 41/141 56/10.2 E |
| 2013/0305677 A1 | 11/2013 | Patterson et al. | |
| 2014/0295922 A1 | 10/2014 | Buermann et al. | |
| 2018/0153102 A1* | 6/2018 | Dunn | A01D 41/127 |
| 2019/0200523 A1* | 7/2019 | Fay, II | A01D 41/145 |
| 2019/0335663 A1* | 11/2019 | Capello | A01D 57/20 |
| 2021/0127575 A1* | 5/2021 | Farley | A01D 41/145 |
| 2021/0185917 A1* | 6/2021 | Hunt | G05B 15/02 |

* cited by examiner

*Primary Examiner* — Alicia Torres
*Assistant Examiner* — Matthew Ian Neal
(74) *Attorney, Agent, or Firm* — Michael Best & Friedrich LLP

(57) ABSTRACT

A harvesting platform is connected to a combine for movement with the combine over the ground surface. The harvesting platform includes a cutter bar that cuts a crop being harvested, and a reel that presses the crop against the cutter bar during harvesting. The cutter bar moves between a cutter bar harvesting position and a cutter bar transport position, and the reel moves between a reel harvesting position and a reel transport position. A controller receives a first signal from a user via a user interface, sends a second signal to the cutter bar to move the cutter bar between the cutter bar harvesting position and the cutter bar transport position in response to the first signal, and send a third signal to the reel to move the reel between the reel harvesting position and the reel transport position in response to the first signal.

20 Claims, 16 Drawing Sheets

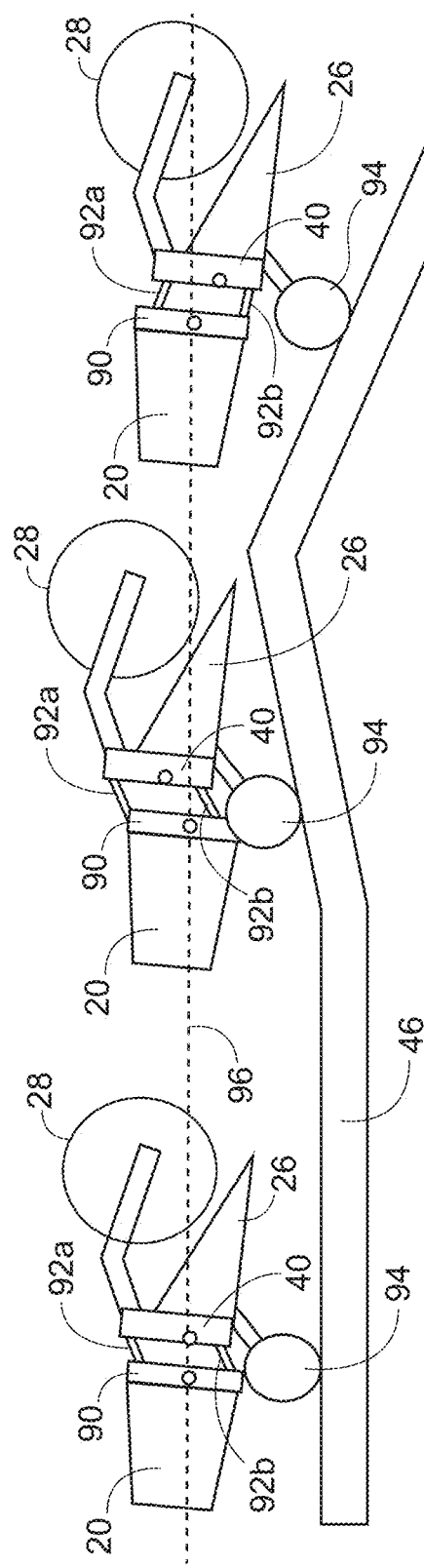

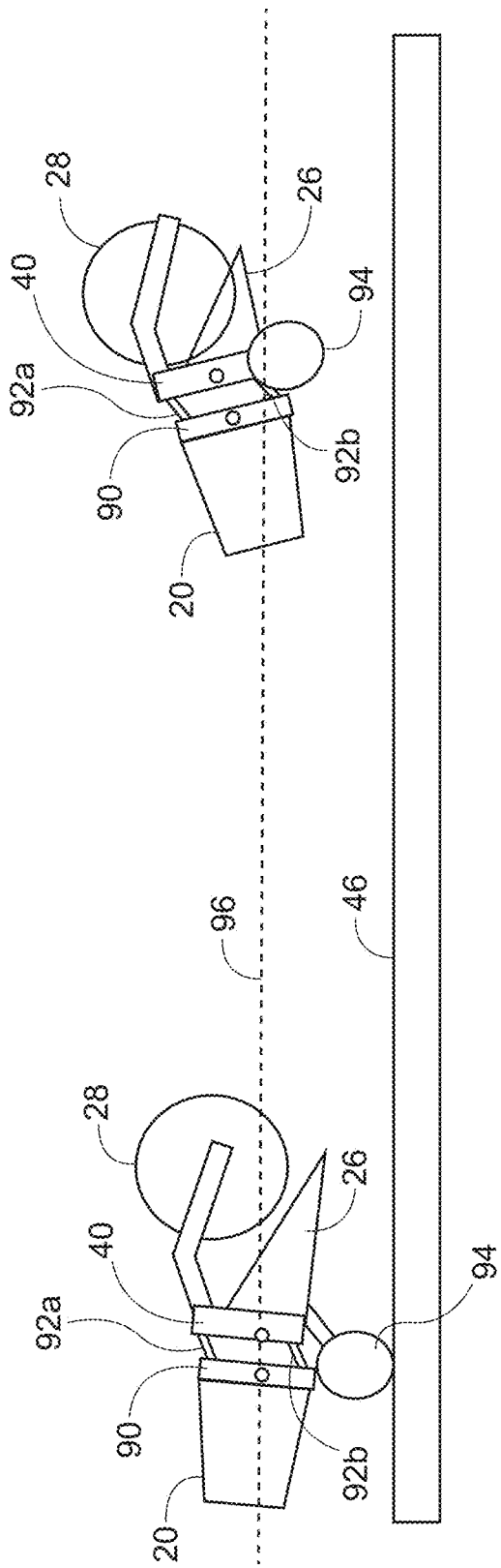

HARVESTER TRANSPORT PREPARATION

BACKGROUND

The present disclosure relates to harvesters and preparing harvesters for transport.

SUMMARY

In some embodiments the disclosure provides a harvester having a combine including a prime mover that moves the combine over a ground surface, and a user interface that is engaged by a user and sends and receives signals. A harvesting platform is connected to the combine for movement with the combine over the ground surface. The harvesting platform includes a cutter bar that cuts a crop being harvested, and a reel that presses the crop against the cutter bar during harvesting. The cutter bar moves between a cutter bar harvesting position and a cutter bar transport position, and the reel moves between a reel harvesting position and a reel transport position. A controller receives a first signal from the user interface, sends a second signal to the cutter bar to move the cutter bar between the cutter bar harvesting position and the cutter bar transport position in response to the first signal, and send a third signal to the reel to move the reel between the reel harvesting position and the reel transport position in response to the first signal.

In some embodiments, the disclosure provides a harvester having a combine including a prime mover that moves the combine over a ground surface, and a user interface that is engaged by a user and sends and receives signals. A harvesting platform is connected to the combine for movement with the combine over the ground surface. The harvesting platform includes a cutter bar that cuts a crop being harvested, a reel that presses the crop against the cutter bar during harvesting, and a gauge wheel that engages the ground surface as the harvesting platform moves over the ground surface. The reel moves between a reel harvesting position and a reel transport position, and the gauge wheel moves between a gauge wheel harvesting position and a gauge wheel transport position. A controller receives a first signal from the user interface, sends a second signal to the reel to move the reel between the reel harvesting position and the reel transport position in response to the first signal, and sends a third signal to the gauge wheel to move the gauge wheel between the gauge wheel harvesting position and the gauge wheel transport position in response to the first signal.

In some embodiments, the disclosure provides a control system for a harvester having a combine, a prime mover operable to move the combine over a ground surface, a cutter bar that cuts a crop being harvested, a reel that presses the crop against the cutter bar during harvesting, the reel moves between a reel harvesting position and a reel transport position, and a gauge wheel that engages the ground surface as the harvesting platform moves over the ground surface. The control system includes a user interface that is engaged by a user and sends and receives signals. The user interface includes a single input device operable to move the reel. A controller receives a first signal from the single input device of the user interface, and receives a second signal from the reel indicative of a current reel position. When the second signal indicates that the reel is in the reel harvesting position, the controller sends a third signal to instruct the reel to move to the reel transport position in response to the first signal. When the second signal indicates that the reel is in the transport position, the controller sends a fourth signal to instruct the reel to move to the reel harvesting position in response to the first signal.

Other aspects of the disclosure will become apparent by consideration of the detailed description and accompanying drawings.

BRIEF DESCRIPTION OF THE DRAWINGS

FIGS. 14A-14C are schematic views of the harvesting platform floating along a ground surface.
FIG. 15 is a schematic view of the harvesting platform in a harvesting position.
FIG. 16 is a schematic view of the harvesting platform in a transport position.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
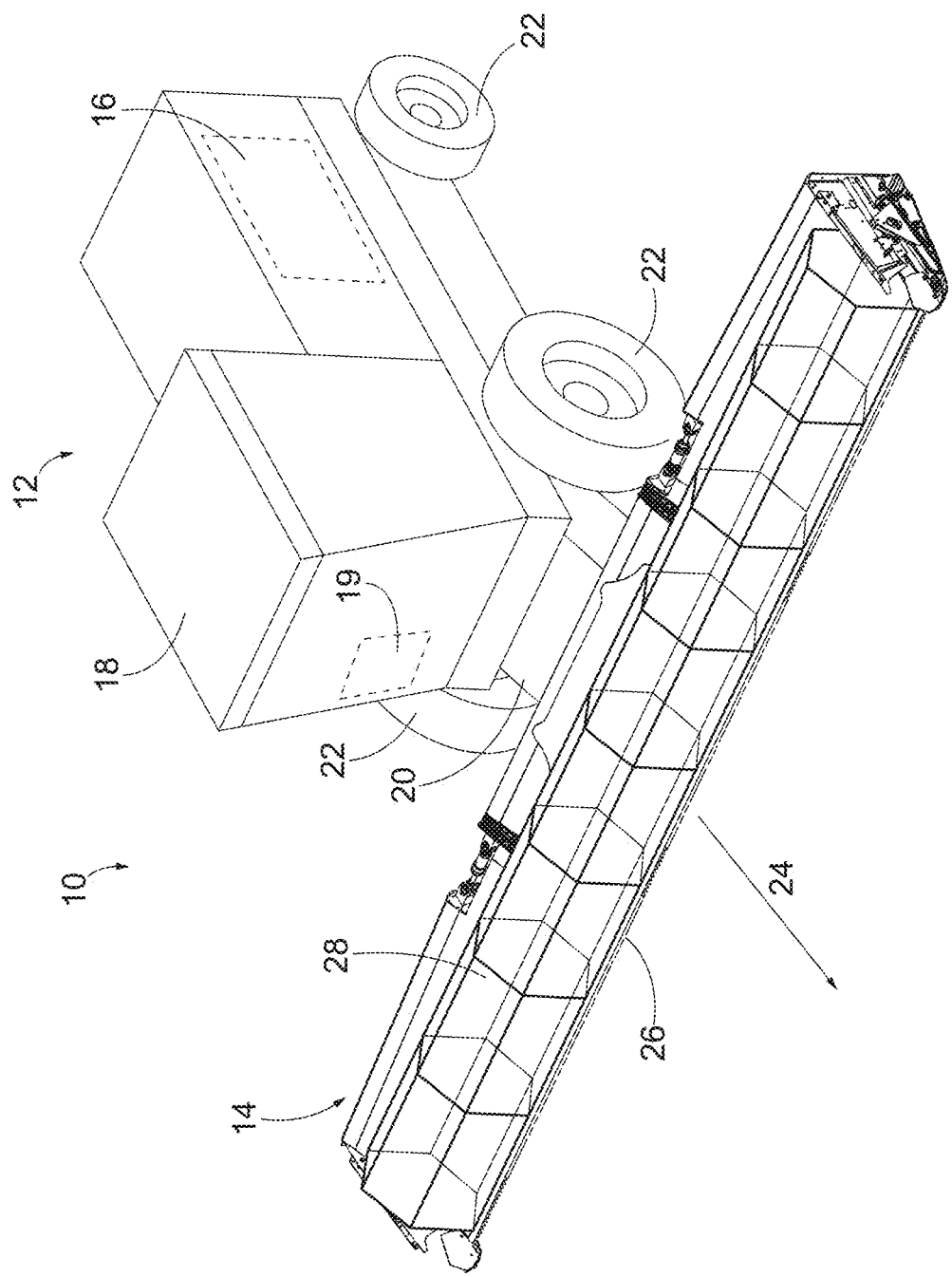
FIG. 1 is a perspective view of a harvester.

FIG. 1 illustrates a harvester 10 according to some embodiments. The illustrated harvester 10 includes a combine 12 and a harvesting platform 14. The combine 12 includes a prime mover 16, a cab 18, a user interface 19, a feeder house 20, and a plurality of ground-engaging devices 22. The prime mover 16 is configured to move the combine 12 in a direction of travel 24 via the ground-engaging devices 22. The illustrated ground-engaging devices 22 are wheels, but tracks or other suitable ground-engaging devices can be utilized.

The harvesting platform 14 includes a cutter bar 26 that is configured to cut grain being harvested, and a reel 28 that configured to press the grain against the cutter bar to thereby cut the grain.

Figure 2:
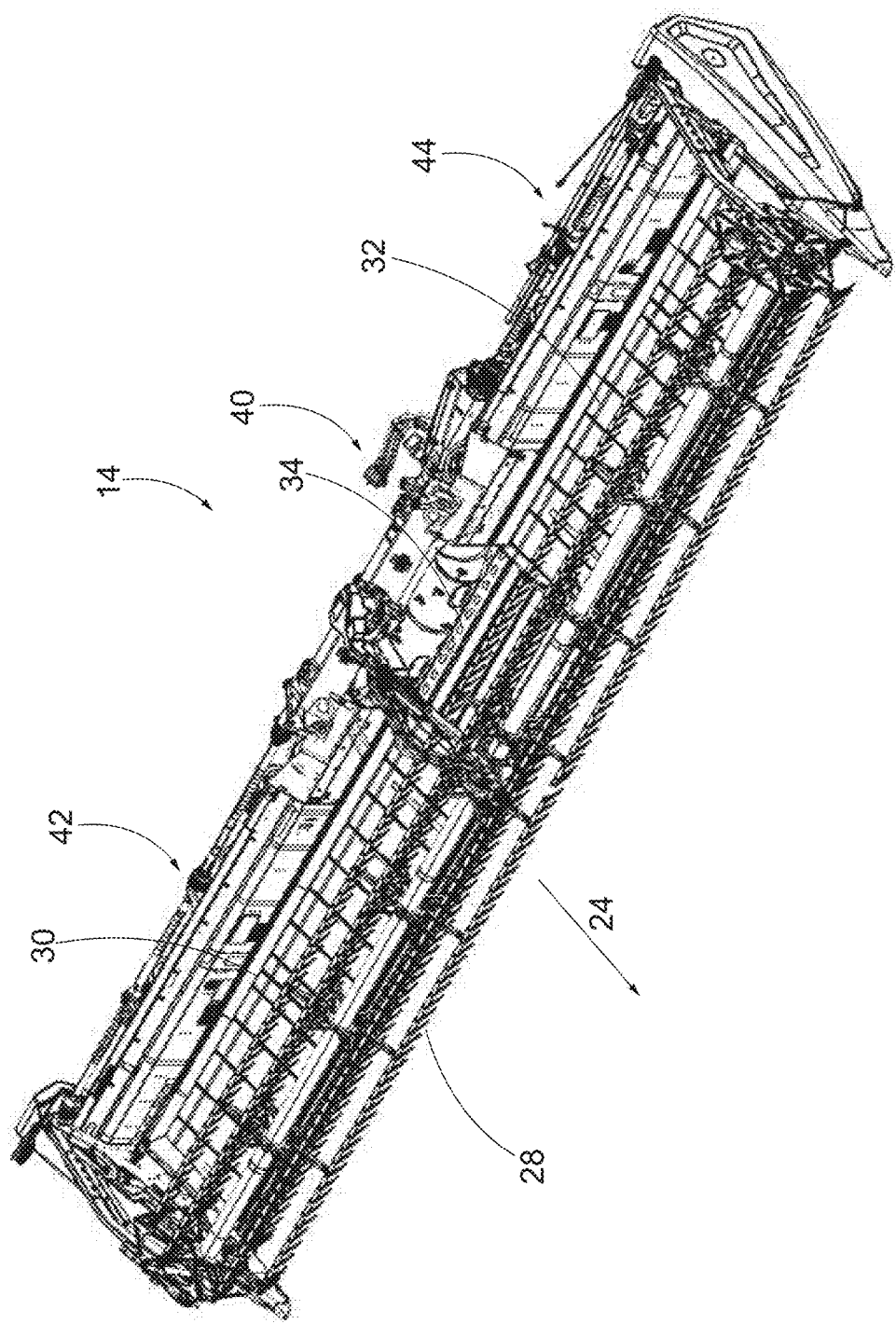
FIG. 2 is a perspective view of a harvesting platform.

FIG. 2 shows the harvesting platform 14 in greater detail. The harvesting platform 14 includes a first conveyor assembly 30, a second conveyor assembly 32, and a third conveyor assembly 34. The first conveyor assembly 30 is configured to move harvested grain generally perpendicular to the direction of travel 24 toward the third conveyor assembly 34. The second conveyor assembly 32 is configured to move harvested grain generally perpendicular to the direction of travel 24 toward the third conveyor assembly 34. The third conveyor assembly 34 is configured to move harvested grain opposite of the direction of travel 24 and into the feeder house 20 (see FIG. 1).

Figure 3:
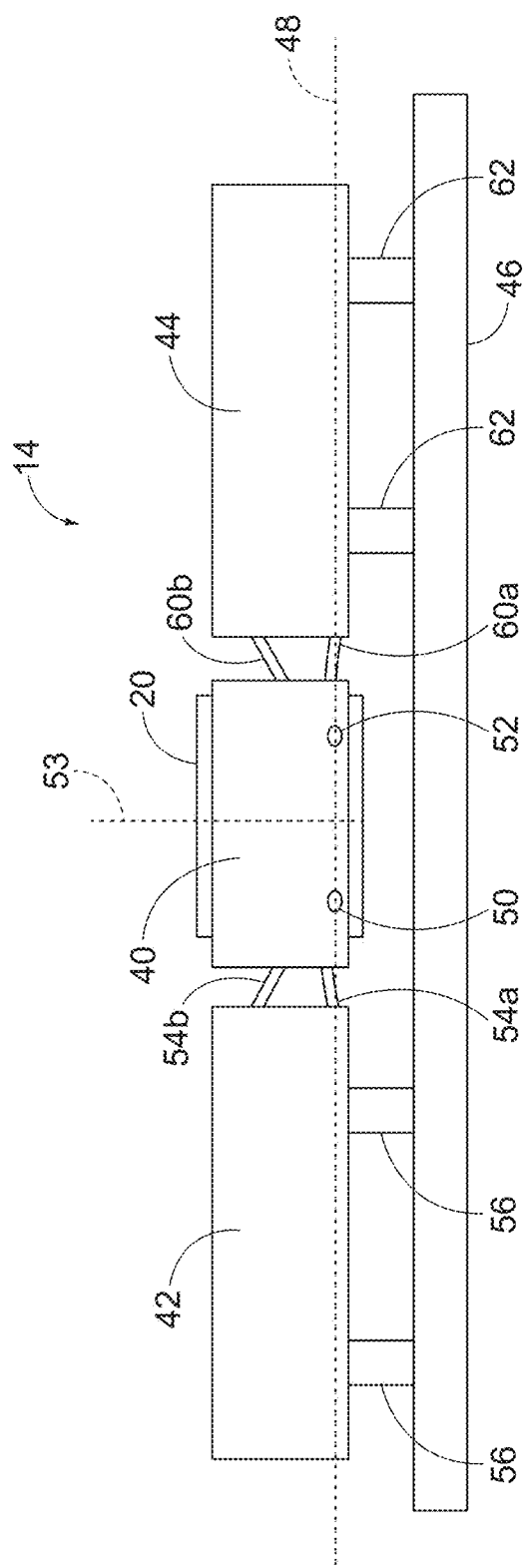
FIG. 3 is a schematic front view of the harvesting platform.

FIG. 3 shows the harvesting platform 14 having a center section 40, a first wing 42 and a second wing 44 all of which are supported on a ground surface 46. The center section 40 is connected to the feeder house 20 of the combine 12 and is permitted to pivot about a relatively small angle (i.e., less than about +/−5 degrees) with respect to the feeder house 20 such that the center section 40 is substantially aligned with the feeder house 20 and the combine 12. The center section 40 extends along a center section plane 48 and includes first and second pivot points 50, 52 positioned within the center section plane 48. In some embodiments, the feeder house 20 defines a center line 53 extending vertically through the feeder house 20 and is substantially perpendicular to the center section plane 48. Substantially perpendicular is defined herein as being between 85 and 95 degrees.

The first wing 42 is connected to the center section 40 by wing control arms 54a, 54b. The wing control arms 54a, 54b are connected to the first pivot point 50 of the center section 40. The first wing 42 is supported on two ground-engaging wheels 56 that move along the ground surface 46. The ground-engaging wheels 56 bear much of the weight of the first wing 42 during operation such that the ground-engaging wheels 56 determine the height of the first wing 42 above the ground surface 46. During operation, the first wing 42 is permitted to pivot within a first range of angles with respect to the center section 40. In some embodiments, the first range of angles is between about +/−15 degrees with respect to the center section 40. In some embodiments, the first range of angles is between about +/−10 degrees with respect to the center section 40. In some embodiments, the first range of angles is between about +/−5 degrees with respect to the center section 40.

The second wing 44 is connected to the center section 40 by wing control arms 60a, 60b. The wing control arms 60a, 60b are connected to the second pivot point 52 of the center section 40. The second wing 44 is supported on two ground-engaging wheels 62 that move along the ground surface 46. The ground-engaging wheels 62 bear much of the weight of the second wing 44 during operation such that the ground-engaging wheels 62 set the height of the second wing 44 above the ground surface 46. During operation, the second wing 44 is permitted to pivot within a second range of angles with respect to the center section 40. In some embodiments, the second range of angles is between about +/−15 degrees with respect to the center section 40. In some embodiments, the second range of angles is between about +/−10 degrees with respect to the center section 40. In some embodiments, the second range of angles is between about +/−5 degrees with respect to the center section 40.

The first wing 42 and the second wing 44 can pivot independently such that the first wing 42 can pivot within the first range of angles while the second wing 44 pivots independently within the second range of angles.

Figure 4:
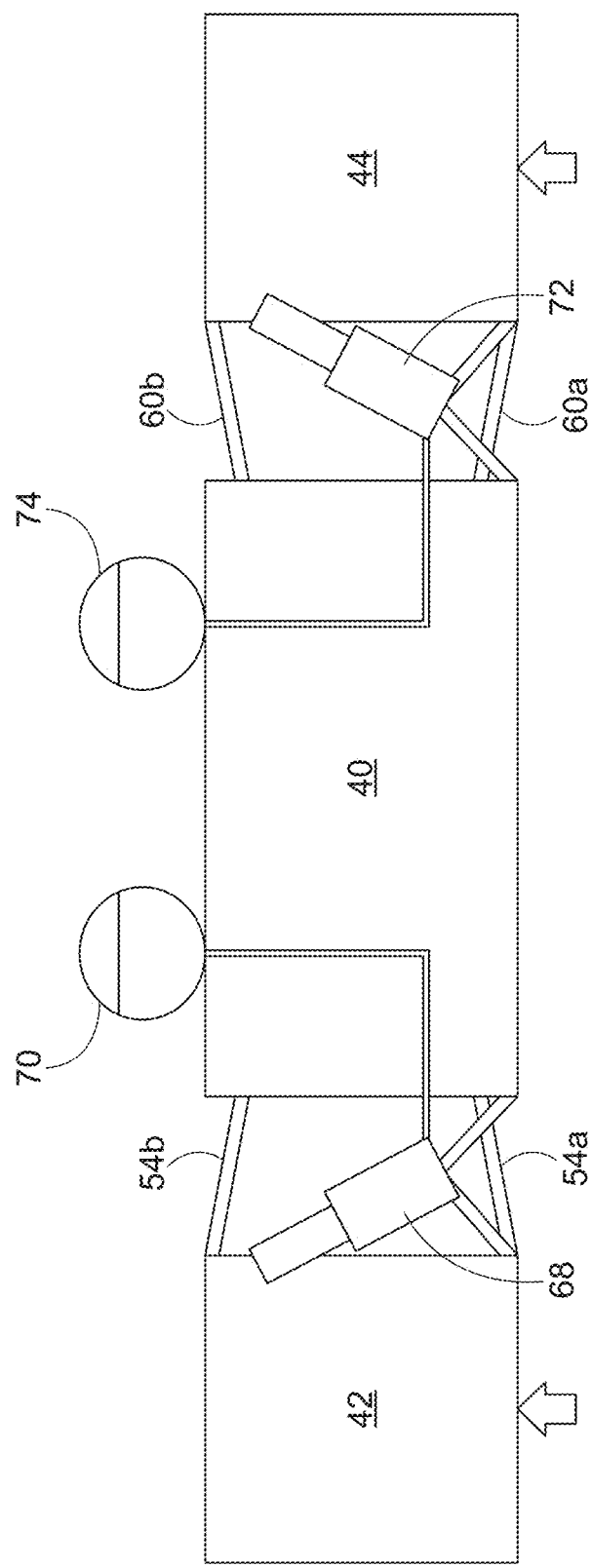
FIG. 4 is a schematic view of the wings connected to a center section.

FIG. 4 illustrates a wing float system for the center section 40, the first wing 42 and the second wing 44. The first wing 42 is connected to the center section 40 by the wing control arms 54a, 54b and a first cylinder 68. The first cylinder 68 includes a first end connected to the first wing 42 and a second end that is connected to both the center section 40 and the first wing 42. The first cylinder 68 is fluidly connected to a first accumulator 70 such that when the first wing 42 is in a level position (substantially parallel to the center section plane 48) a pressure in the first accumulator 70 provides a force to the first cylinder 68 to bear a portion of the weight of the first wing 42.

The second wing 44 is connected to the center section 40 by the wing control arms 60a, 60b and a second cylinder 72. The second cylinder 72 includes a first end connected to the second wing 44 and a second end that is connected to both the center section 40 and the second wing 44. The second cylinder 72 is fluidly connected to a second accumulator 74 such that when the second wing 44 is in a level position (substantially parallel to the center section plane 48) a pressure in the second accumulator 74 provides a force to the second cylinder 72 to bear a portion of the weight of the second wing 44.

Figure 5:
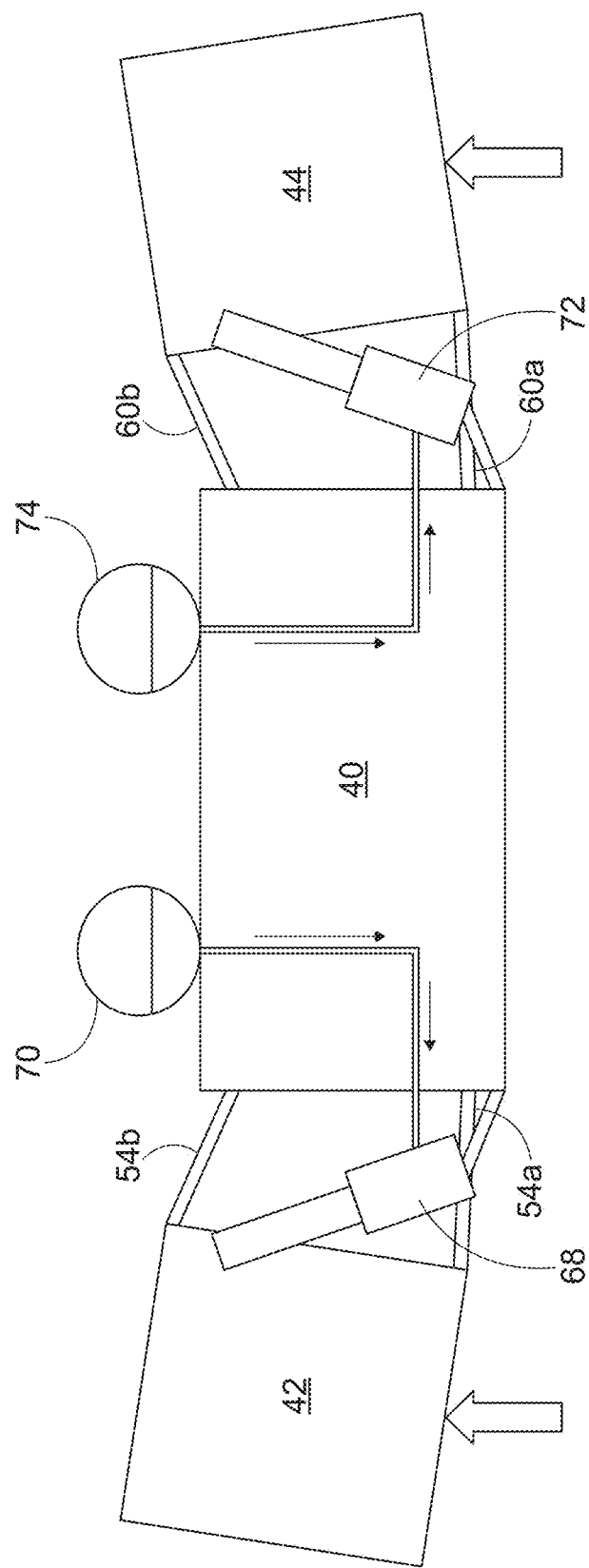
FIG. 5 is a schematic view of the wings floating upward.

FIG. 5 illustrates the wing float system when both the first wing 42 and the second wing 44 encounter an input (such as a hill or bump in the ground surface 46) and travel upward. The first wing 42 is pushed upward by the ground-engaging wheels 56 moving upward in response to the input. Fluid is drawn from the first accumulator 70 into the first cylinder 68 in response to the upward movement of the first wing 42. The pressure in the first accumulator 70 is lower when the first wing 42 is above a level position (i.e., at a positive, non-parallel angle with respect to the center section plane 48). The second wing 44 is pushed upward by the ground-engaging wheels 62 moving upward in response to the input. Fluid is drawn from the second accumulator 74 into the second cylinder 72 in response to the upward movement of the second wing 44. The pressure in the second accumulator 74 is lower when the second wing 44 is above a level position (i.e., at a positive, non-parallel angle with respect to the center section plane 48).

Figure 6:
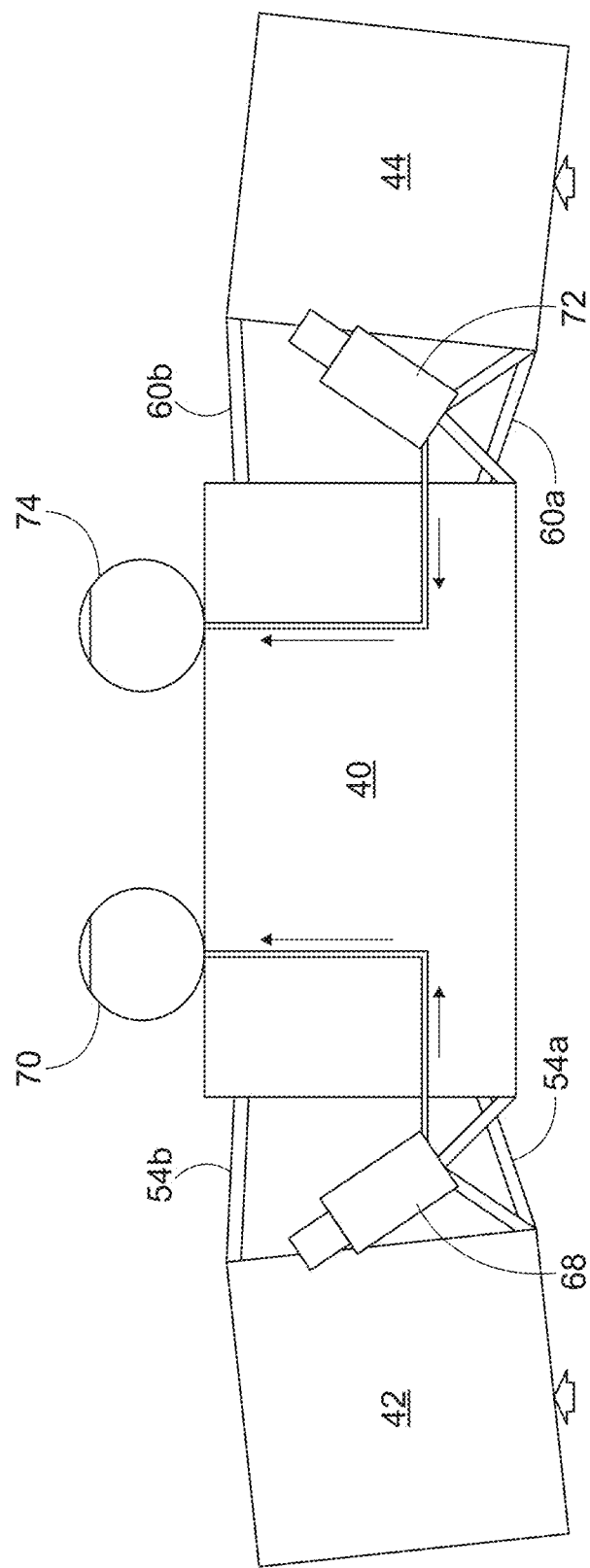
FIG. 6 is a schematic view of the wings floating downward.

FIG. 6 illustrates the wing float system when the first wing 42 encounters an input (such as a recess or valley in the ground surface 46) and travels downward. The first wing 42 is pushed downward by gravity until the ground-engaging wheels 56 engage the ground surface 46. Fluid is moved from the first cylinder 68 into the first accumulator 70 in response to the downward movement of the first wing 42. The pressure in the first accumulator 70 is greater when the first wing 42 is below a level position (i.e., at a negative, non-parallel angle with respect to the center section plane 48). The ground-engaging wheels 56 and the first cylinder 68 bear the weight of the first wing 42. The first accumulator 70 permits passive adjustment of the first wing 42 within the first range of angles as described above. The second wing 44 is pushed downward by gravity until the ground-engaging wheels 62 engage the ground surface 46. Fluid is moved from the second cylinder 72 into the second accumulator 74 in response to the downward movement of the second wing 44. The pressure in the second accumulator 74 is greater when the second wing 44 is below a level position (i.e., at a negative, non-parallel angle with respect to the center section plane 48). The ground-engaging wheels 62 and the second cylinder 72 bear the weight of the second wing 44. The second accumulator 74 permits passive adjustment of the second wing 44 within the second range of angles as described above.

Figure 7:
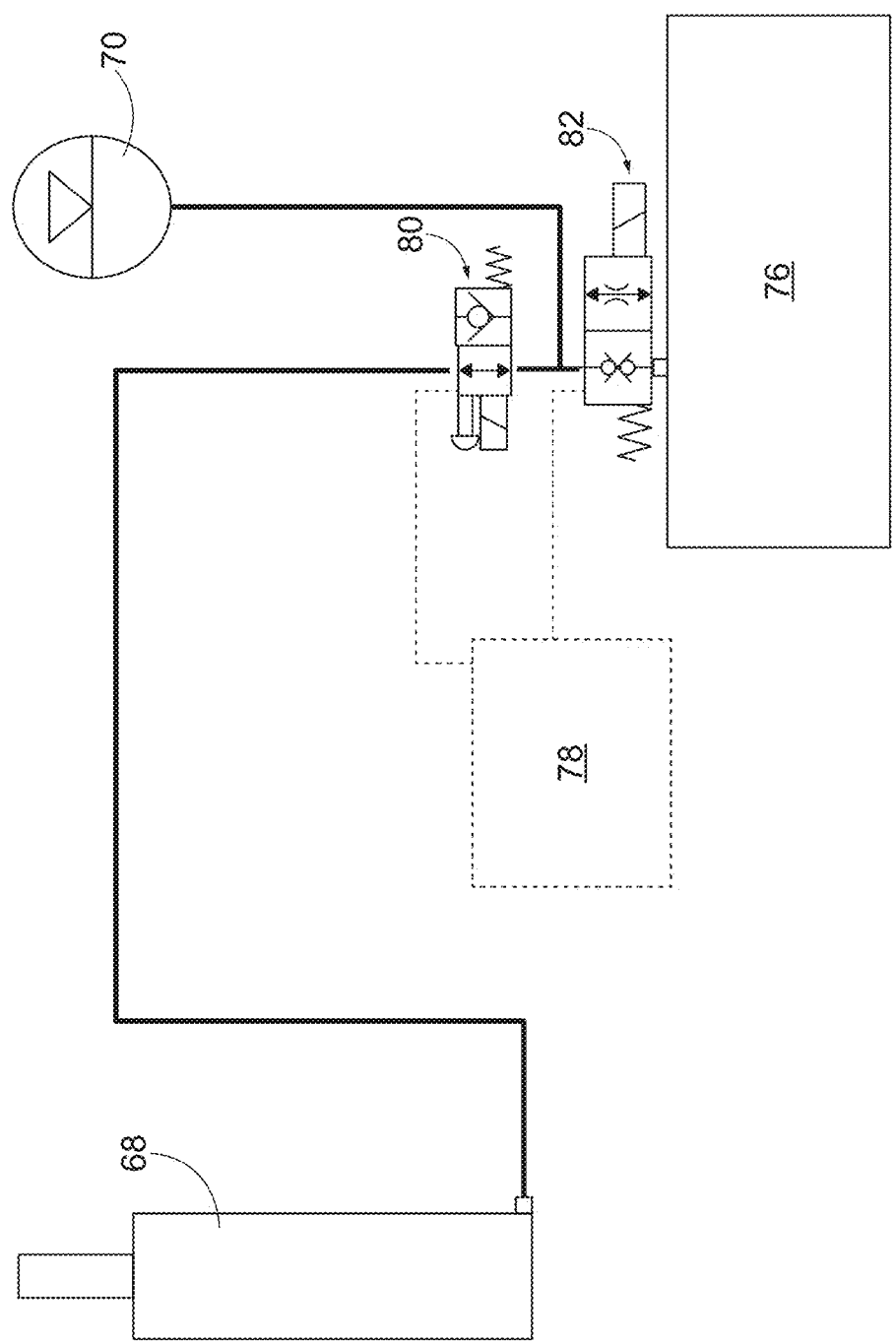
FIG. 7 is a schematic view of an unlocked wing circuit with the first wing in an operating position.

FIG. 7 illustrates a first hydraulic circuit including the first cylinder 68, the first accumulator 70, a fluid reservoir 76, a controller 78, a first valve 80 and a second valve 82. The controller 78 is electrically connected to the first valve 80 to send signals to the first valve 80 to open and close the first valve 80. Fluid flows between the first cylinder 68 and the first accumulator 70 while the first valve 80 is open and is inhibited from flowing between the first cylinder 68 and the first accumulator 70 while the first valve 80 is closed.

The controller 78 is also electrically connected to the second valve 82 to send signals to the second valve 82 to open and close the second valve 82. Fluid flows between the reservoir 76 and the first accumulator 70 while the second valve 82 is open and is inhibited from flowing between the reservoir 76 and the first accumulator 70 while the second valve 82 is closed. While both the first valve 80 and the second valve 82 are opened, fluid is permitted to flow between the first cylinder 68, the first accumulator 70 and the reservoir 76. During normal operation such as shown in FIGS. 4-6, the first valve 80 is open to permit fluid flow between the first cylinder 68 and the first accumulator 70 to permit the first wing 42 to be passively raised and lowered in response to changes in terrain.

Figure 8:
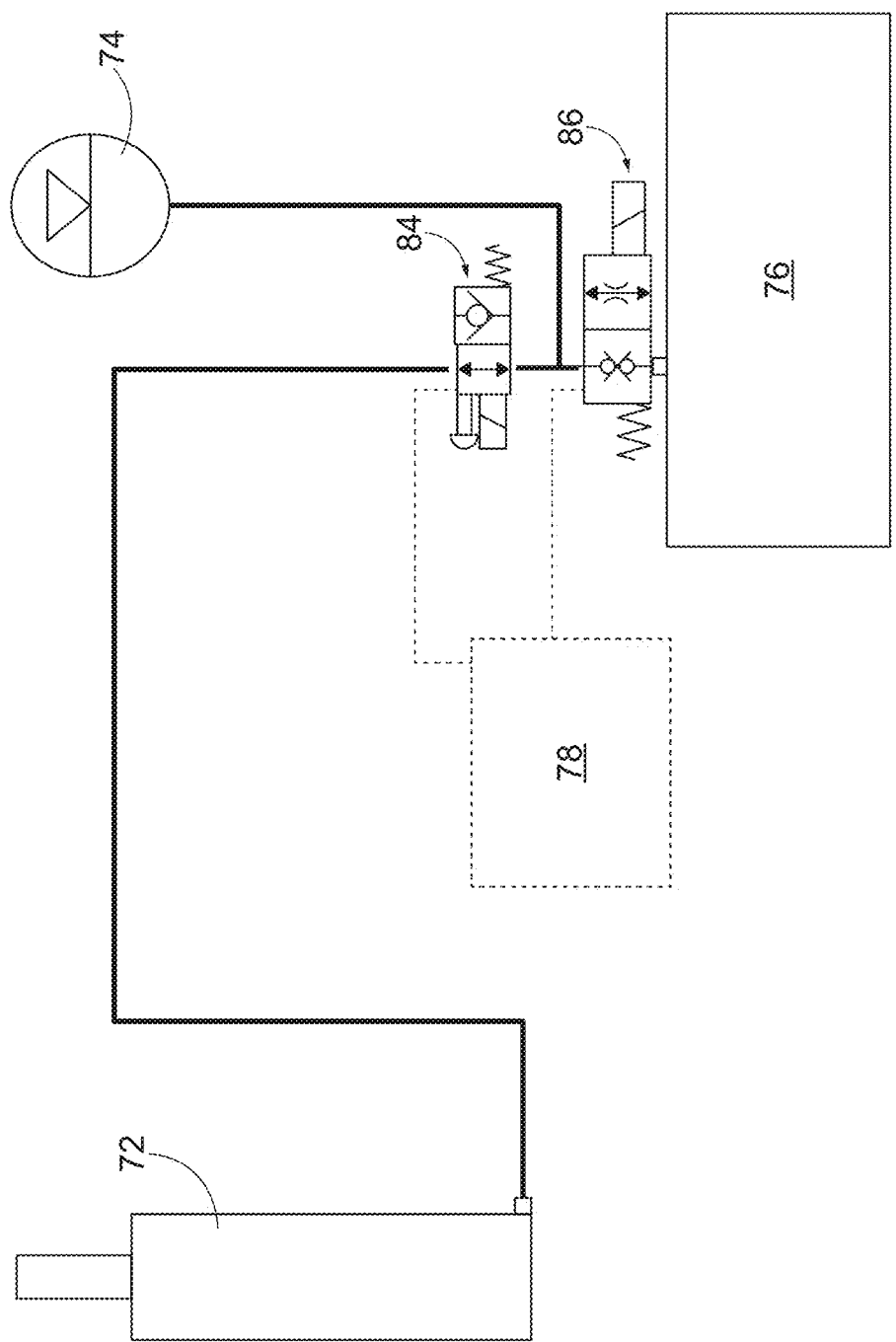
FIG. 8 is a schematic view of an unlocked wing circuit with the second wing in an operating position.

FIG. 8 illustrates a second hydraulic circuit including the second cylinder 72, the second accumulator 74, the fluid reservoir 76, the controller 78, a third valve 84, and a fourth valve 86. The controller 78 is electrically connected to the third valve 84 to send signals to the third valve 84 to open and close the third valve 84. Fluid flows between the second cylinder 72 and the second accumulator 74 while the third valve 84 is open and is inhibited from flowing between the second cylinder 72 and the second accumulator 74 while the third valve 84 is closed.

The controller 78 is also electrically connected to the fourth valve 86 to send signals to the fourth valve 86 to open and close the fourth valve 86. Fluid flows between the reservoir 76 and the second accumulator 74 while the fourth valve 86 is open and is inhibited from flowing between the reservoir 76 and the second accumulator 74 while the fourth valve 86 is closed. While both the third valve 84 and the fourth valve 86 are opened, fluid is permitted to flow between the second cylinder 72, the second accumulator 74 and the reservoir 76. During normal operation such as shown in FIGS. 4-6, the third valve 84 is open to permit fluid flow between the second cylinder 72 and the second accumulator 74 to permit the second wing 44 to be passively raised and lowered in response to changes in terrain.

The reservoir 76 functions a secondary accumulator to permit pressure regulation between the first cylinder 68 and the first accumulator 70 as well as between the second cylinder 72 and the second accumulator 74. The reservoir 76 also functions as a source of fluid when a pump is utilized to direct fluid into the first cylinder 68 to automatically raise the first wing 42, or into the second cylinder 72 to automatically raise the second wing 44.

Figure 9:
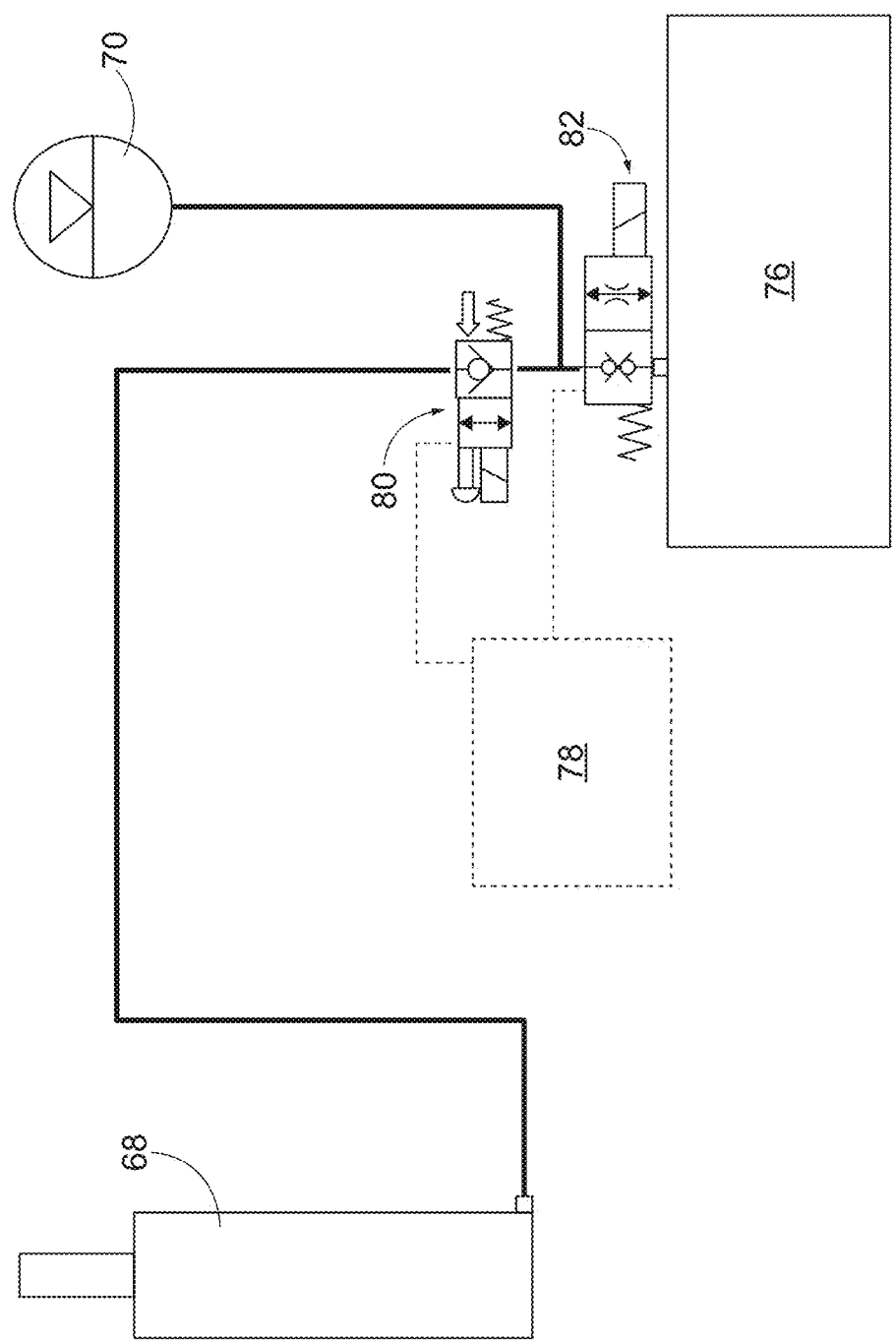
FIG. 9 is a schematic view of a locked wing circuit with the first wing in a raised position.

FIG. 9 illustrates the first hydraulic circuit in which the first valve 80 has been closed in response a signal from the controller 78. For example, when the operator selects a transport operation of the harvester 10, the harvester 10 transitions from harvesting to transport. The controller 78 sends a signal to the first valve 80 to close to thereby retain the first wing 42 in the position in which the first wing 42 was at when harvesting was concluded.

Figure 10:
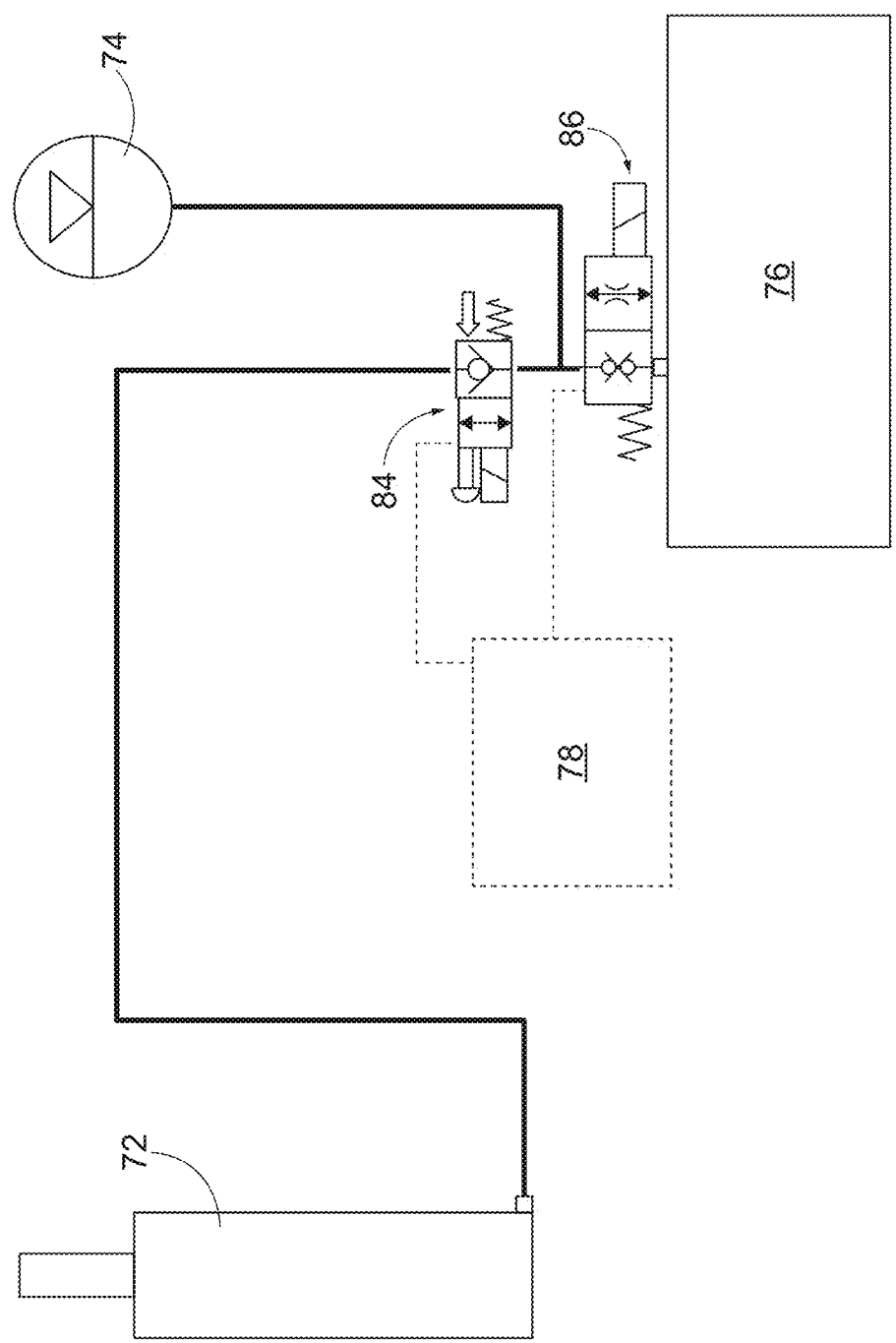
FIG. 10 is a schematic view of a locked wing circuit with the second wing in a raised position.

FIG. 10 illustrates the second hydraulic circuit in which the third valve 84 has been closed in response to a signal from the controller 78. For example, when the operator selects a transport operation of the harvester 10, the harvester 10 transitions from harvesting to transport. The controller 78 sends a signal to the third valve 84 to close to thereby retain the second wing 44 in the position in which the second wing 44 was at when harvesting was concluded.

Figure 11:
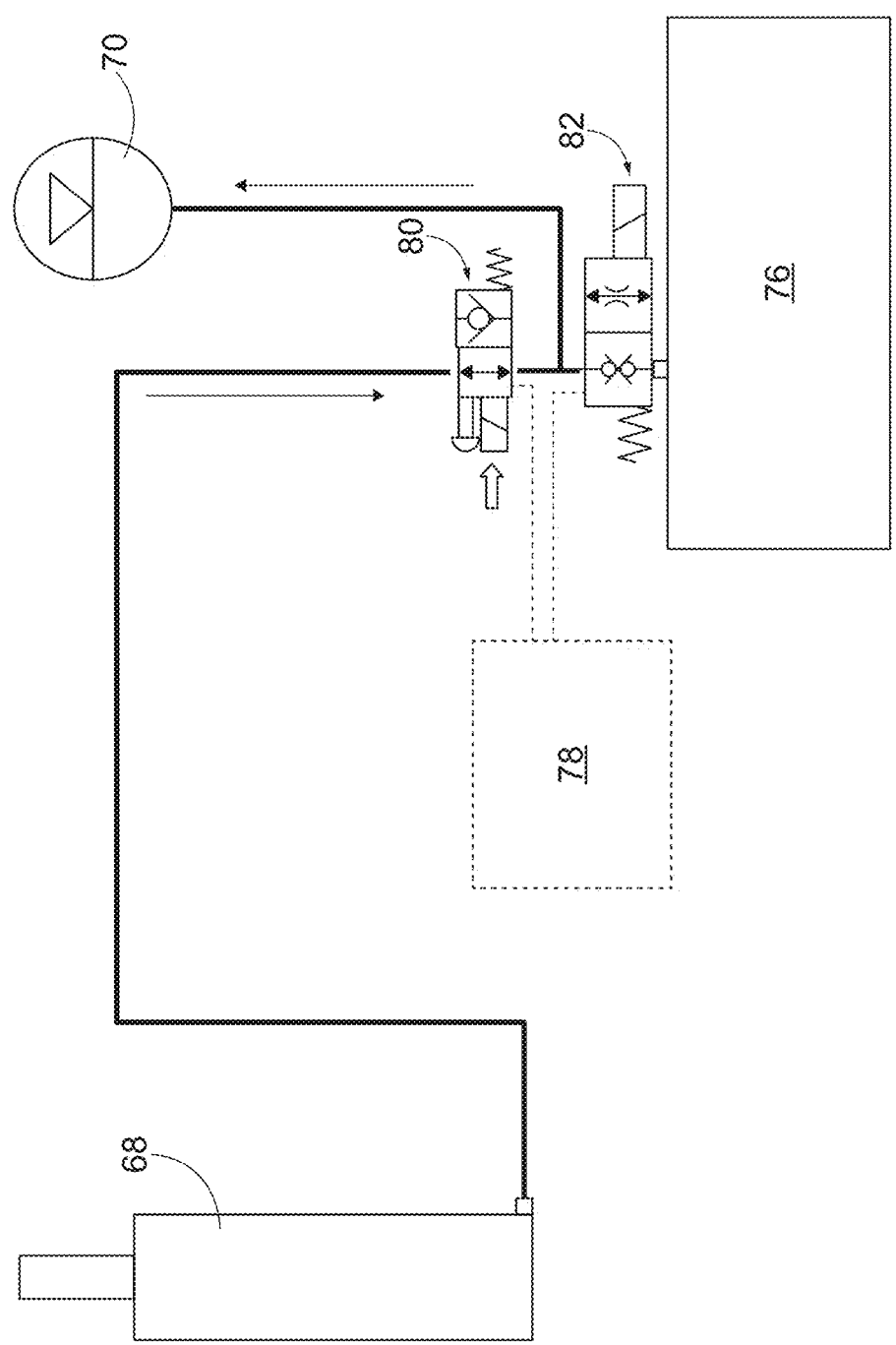
FIG. 11 is a schematic view of an unlocked wing circuit with the first wing in a raised position.

The controller 78 receives a first signal indicative of the first position of the first wing 42. If the first wing 42 is retained in a raised position such as the position shown in FIG. 5 (i.e., at a positive, non-parallel angle with respect to the center section plane 48), then the controller 78 sends a signal to the first valve 80 to open the first valve 80. While the first valve 80 is opened, fluid is permitted to move from the first cylinder 68 through the first valve 80 into the first accumulator 70, as shown in FIG. 11. Fluid is moved in response to gravity pulling down against the first wing 42 to thereby passively lower the first wing 42 when the first valve 80 is opened. The controller 78 continues to receive the first signal indicative of the first position of the first wing 42. If the first position of the first wing 42 is at a level or lowered position (i.e., substantially parallel to the center section plane 48 or at a negative, non-parallel angle with respect to the center section plane 48), then the controller 78 sends a signal to the first valve 80 to close the first valve 80. While the first valve 80 is closed, fluid is inhibited from moving from the first cylinder 68 through the first valve 80 into the first accumulator 70 as shown in FIG. 9.

Figure 12:
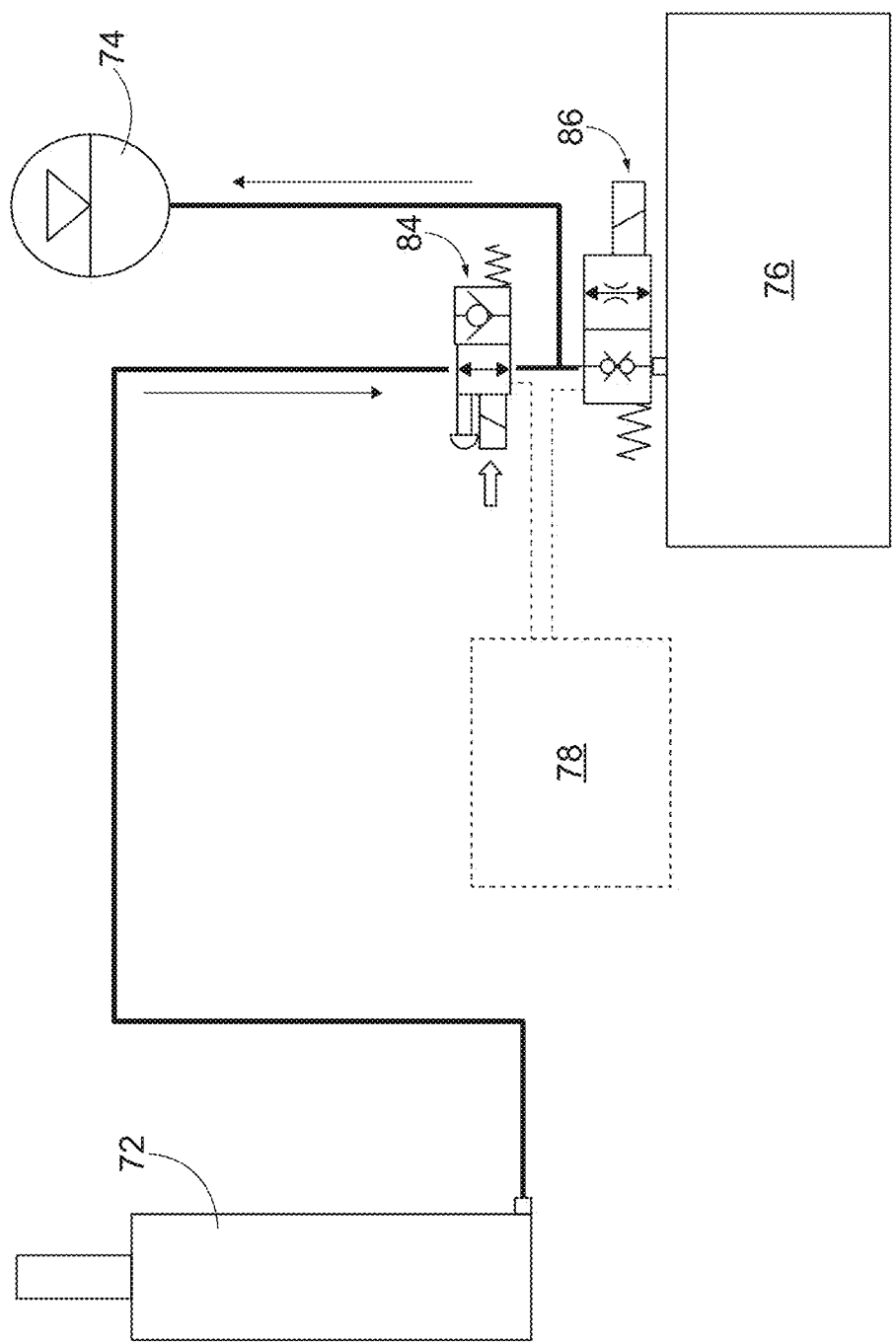
FIG. 12 is a schematic view of an unlocked wing circuit with the second wing in a raised position.

The controller 78 also receives a second signal indicative of the second position of the second wing 44. If the second wing 44 is retained in a raised position such as the position shown in FIG. 5 (i.e., at a positive, non-parallel angle with respect to the center section plane 48), then the controller 78 sends a signal to the third valve 84 to open the third valve 84. While the third valve 84 is opened, fluid is permitted to move from the second cylinder 72 through the third valve 84 into the second accumulator 74 as shown in FIG. 12. Fluid is moved in response to gravity pulling down against the second wing 44 to thereby passively lower the second wing 44 when the third valve 84 is opened. The controller 78 continues to receive the second signal indicative of the second position of the second wing 44. If the second position of the second wing 44 is at a level or lowered position (i.e., substantially parallel to the center section plane 48 or at a negative, non-parallel angle with respect to the center section plane 48), then the controller 78 sends a signal to the third valve 84 to close the third valve 84. While the third valve 84 is closed, fluid is inhibited from moving from the second cylinder 72 through the third valve 84 into the second accumulator 74 as shown in FIG. 10.

Figure 13:
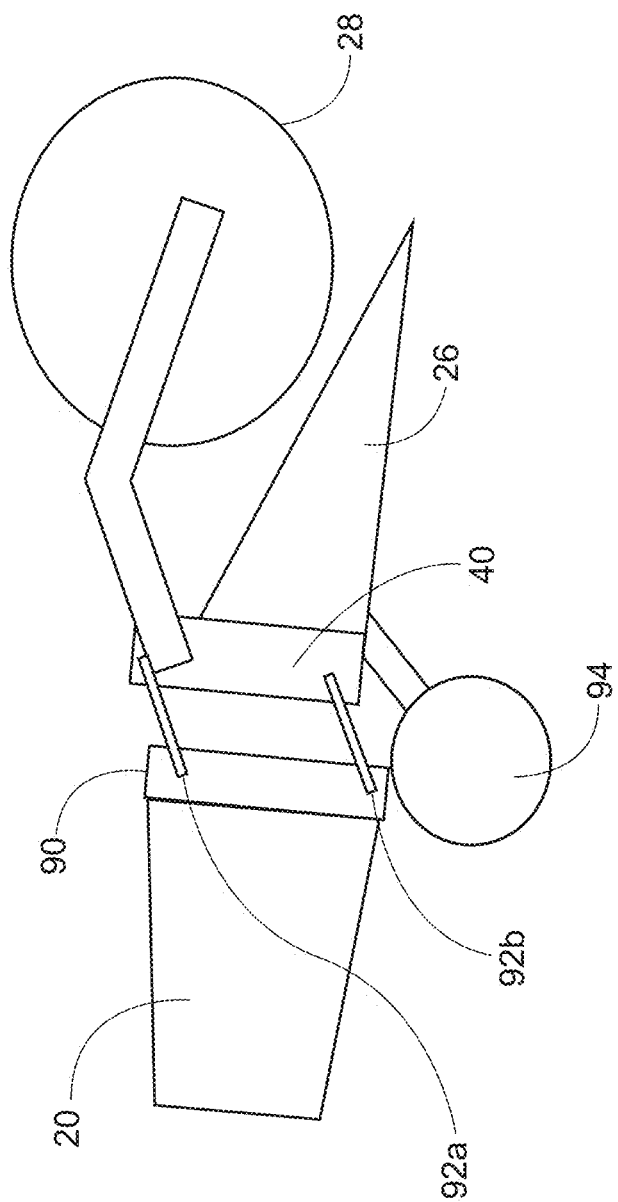
FIG. 13 is a schematic side view of harvesting platform of FIG. 3.

FIG. 13 shows a side view of the connection between the feeder house 20 and the center section 40. An attachment frame 90 is connected to the feeder house 20 and a pair of attachment arms 92a, 92b are connected to the attachment frame 90 and to the center section 40. The cutter bar 26, the reel 28 and a gauge wheel 94 are connected to the center section 40. The gauge wheel 94 supports the center section 40 above the ground surface. A height of the center section 40 above the ground surface can be set and adjusted by the user. The attachment arms 92a, 92b permit the center section 40 to move with respect to the attachment frame 90 and the feeder house 20.

FIGS. 14A-14C illustrate that center section 40 can passively move with respect to the attachment frame 90 and the feeder house 20 in response to a contour of the ground surface 46. The feeder house 20 defines a plane 96 extending horizontally with respect to the feeder house 20. FIG. 14A illustrates the center section 40 substantially vertically aligned with the plane 96. FIG. 14B illustrates the center section 40 at a raised position above the plane 96 as the gauge wheel 94 moves up an incline formed by the ground surface 46. FIG. 14C illustrates the center section 40 at a lowered position below the plane 96 as the gauge wheel 94 moves down a decline formed by the ground surface 46.

FIG. 15 illustrates a harvesting position in which a center portion of the feeder house 20 is positioned in the plane 96. The cutter bar harvesting position includes the cutter bar 26 extending at an acute angle downward below the plane 96 and being elongated. The reel harvesting position includes the reel 28 being positioned at a distance from the center section 40 and extending above and below the plane 96. The gauge wheel harvesting position includes the gauge wheel 94 extending downward and engaging the ground surface.

FIG. 16 illustrates a transport position in which a center portion of the feeder house 20 is positioned vertically above the plane 96. The cutter bar transport position includes the cutter bar 26 extending at an acute angle upward above the plane 96 and being retracted. The reel transport position includes the reel 28 being positioned at a shorter distance from the center section and extending above the plane 96. The gauge wheel transport position includes the gauge wheel 94 spaced above the ground surface and extending both above and below the plane 96.

The controller 78 (shown in FIGS. 7-12) is configured to move the components between the harvesting position and the transport position in response to input from a user via the user interface 19. When the user actuates a single device (i.e., a button, switch or other actuation mechanism) on the user interface, the controller 78 receives a signal from the single device and sends signals to the various moving components of the machine. The controller 78 also receives signals from the various moving components indicative of the current position of the various components (i.e., harvesting position or travel position). In response to the signals from the moving components indicating of the current position of the moving components, the controller 78 sends signals to the moving components to move to the appropriate position. For example, if the components are in the harvesting position, the components are instructed to move to the transport position, whereas if the components are in the transport position, the components are instructed to move to the harvesting position. The controller 78 is programmed to move the components in the appropriate sequence to effectively move the components between the harvesting and transport positions. Previously, the user was required to enter a sequence of inputs in order to properly fold and unfold the components. That required a great deal of skill and created greater operator fatigue. In the present disclosure, the controller 78 sends signals to the moving components in response a single input from the user and in response to position signals from the moving components.

Figure 17:
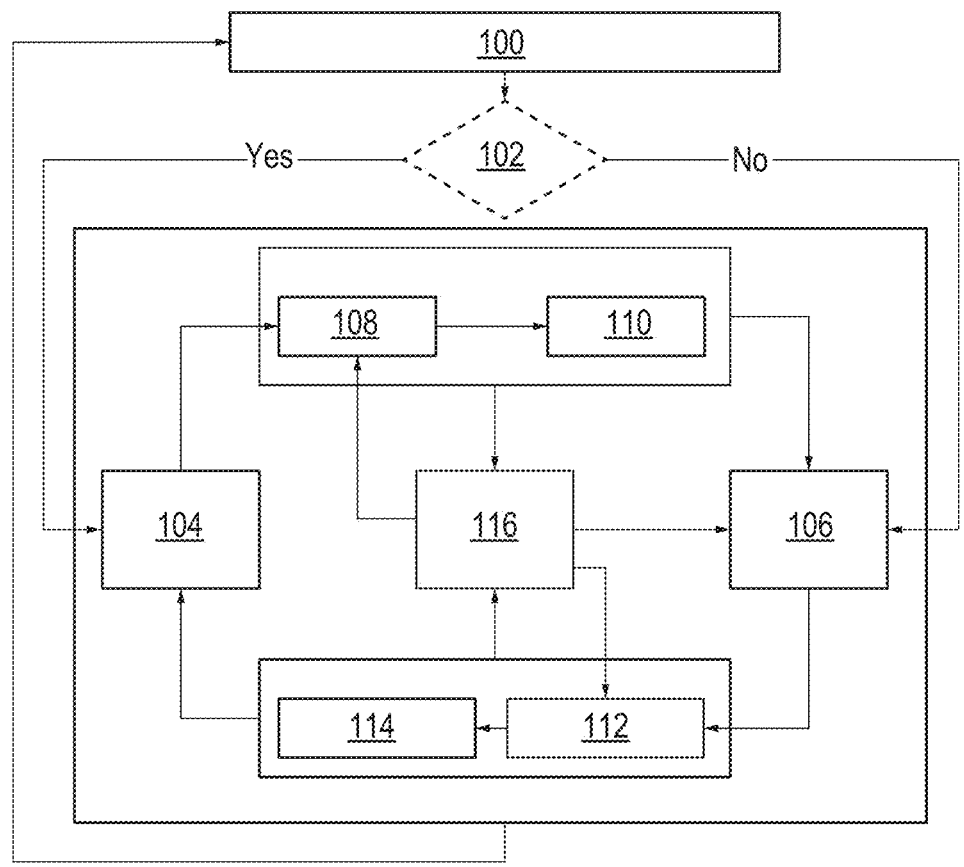
FIG. 17 is a flow chart of the harvesting platform transitioning between a harvesting position and a transport position.

FIG. 17 is a flow chart illustrating one possible method of moving the feeder house 20, the cutter bar 26, the reel 28 and the gauge wheel 94 between the harvesting position and the transport position. Operation begins at step 100 in response to the user actuating the single device (i.e., a button, switch or other actuation mechanism) on the user interface 19 to initiate movement between the harvesting position and the transport position. The same single device can be utilized to move to the harvesting position and subsequently to move to the transport position. Step 100 illustrates the machine being in disabled mode. Step 102 enquires if the machine is in the transport position. If the machine is in the transport position, operation moves to step 104 at which the machine has been determined to be fully folded into the transport position. If the machine is in the harvesting position, operation moves to step 106 at which the machine has been determined to be fully unfolded into the harvesting position.

When the machine has been determined to be fully folded into the transport position in response to the user actuating the single device (at step 104), operation moves to step 108 at which primary unfolding of the machine begins. As long as unfolding of the machine is not interrupted (i.e., by the operator or by another outside influence), operation continues to step 110 at which unfolding of the machine is completed. When unfolding of the machine is complete, operation moves to step 106.

If unfolding of the machine is interrupted at step 108 or 110, operation moves to step 116. When unfolding of the machine is resumed by the operator, operation returns to step 108 to ensure that the machine unfolds the components in the proper order.

When the machine has been determined to be fully unfolded into the harvesting position (at step 106) in response to the user actuating the single device, operation moves to step 112 at which primary folding of the machine begins. As long as folding of the machine is not interrupted (i.e., by the operator or by another outside influence), operation continues to step 114 at which folding of the machine is completed. When folding of the machine is complete, operation moves to step 104.

If folding of the machine is interrupted at step 112 or 114, operation moves to step 116. When folding of the machine is resumed by the operator, operation returns to step 112 to ensure that the machine folds the components in the proper order.

In some embodiments, only the reel 28 moves between the harvesting position and the transport position. In some embodiments, the cutter bar 26 and the reel 28 both move between the harvesting position and the transport position. In some embodiments, the reel 28 and the gauge wheel 94 both move between the harvesting position and the transport position. In some embodiments, the cutter bar 26, the reel 28 and the gauge wheel 94 all move between the harvesting position and the transport position. In some embodiments, the first wing 42 and the second wing 44 move between the harvesting position and the transport position in addition to the reel 28, and optionally in addition to the cutter bar 26 and/or the gauge wheel 94.

What is claimed is:

1. A harvester comprising:
    a combine including
        a prime mover operable to move the combine over a ground surface, and
        a user interface configured to be engaged by a user and configured to send and receive signals, and
        a feeder house defining a center line;
    a harvesting platform connected to the combine for movement with the combine over the ground surface, the harvesting platform including
        a cutter bar configured to cut a crop being harvested, the cutter bar moveable between a cutter bar harvesting position and a cutter bar transport position,
        a reel configured to press the crop against the cutter bar during harvesting, the reel moveable between a reel harvesting position and a reel transport position; and
        a first section connected to the combine, the first section having a first side and a second side opposite the first side, the first section extending along a first section plane that is substantially parallel to the ground surface;
        a second section connected to the first side of the first section, the second section being rotatable with respect to the first section within a range of angular positions; and
        a locking mechanism configured to retain the second section in a position with respect to the first section while the locking mechanism is activated, and configured to permit movement of the second section with respect to the first section while the locking mechanism is deactivated, and a controller configured to
receive a first signal from the user interface,
send a second signal to the cutter bar to move the cutter bar between the cutter bar harvesting position and the cutter bar transport position in response to the first signal,
send a third signal to the reel to move the reel between the reel harvesting position and the reel transport position in response to the first signal,
receive a fourth signal indicative of the position of the second section, and
send a fifth signal to the locking mechanism to deactivate the locking mechanism in response to the position of the second section being at a positive non-parallel angle with respect to the first section plane.

2. The harvester of claim 1, wherein the harvesting platform further comprises a gauge wheel configured to engage the ground surface as the harvesting platform moves over the ground surface, the gauge wheel moveable between a gauge wheel harvesting position and a gauge wheel transport position,
wherein the controller is further configured to send a sixth signal to the gauge wheel to move the gauge wheel between the gauge wheel harvesting position and the gauge wheel transport position in response to the first signal.

3. The harvester of claim 1, wherein the controller is configured to receive a sixth signal from the reel indicative of a current reel position prior to sending the third signal to the reel, such that if the sixth signal indicates that the reel is in the reel harvesting position, the third signal instructs the reel to move to the reel transport position and if the sixth signal indicates that the reel is in the reel transport position, the third signal instructs the reel to move to the reel harvesting position.

4. The harvesting platform of claim 1, wherein the range of angular positions is a first range of angular positions, the locking mechanism is a first locking mechanism, and the position is a first position, the harvesting platform further including
a third section connected to the second side of the first section, the third section being rotatable with respect to the first section within a second range of positions, and
a second locking mechanism configured to retain the third section in a second position with respect to the first section while the second locking mechanism is activated and configured to permit movement of the third section with respect to the first section while the second locking mechanism is deactivated,
wherein the controller is further configured to receive a sixth signal indicative of the second position and configured to send a seventh signal to the second locking mechanism to deactivate the second locking mechanism in response to the second position being at a positive non-parallel angle with respect to the first section plane, and
wherein the third section is configured to move toward the first section plane in response to gravity while the second locking mechanism is deactivated.

5. The harvesting platform of claim 4, wherein the controller is configured to send eighth signal to the first locking mechanism to activate the first locking mechanism and to send a ninth signal to the second locking mechanism to activate the second locking mechanism in response to an operator selecting a transport operation of the combine,
wherein the controller is configured to continue sending the eighth signal to the first locking mechanism to maintain activation of the first locking mechanism in response to the first position being at a negative non-parallel angle with respect to the first section plane, and is configured to continue sending the ninth signal to the second locking mechanism to maintain activation of the second locking mechanism in response to the second position being at a negative non-parallel angle with respect to the first section plane, and
wherein the controller is configured to continue sending the eighth signal to the first locking mechanism to activate the first locking mechanism in response to the first position being substantially parallel to the first section plane, and is configured to continue sending the ninth signal to the second locking mechanism to activate the second locking mechanism in response to the second position being substantially parallel to the first section plane.

6. The harvesting platform of claim 1, wherein the locking mechanism includes a cylinder, an accumulator and a valve fluidly positioned between the cylinder and the accumulator, and
wherein while the locking mechanism is activated, the valve is closed to inhibit fluid flow between the cylinder and the accumulator, and while the locking mechanism is deactivated, the valve is opened to permit fluid flow from the cylinder to the accumulator.

7. A harvester comprising:
a combine including
a prime mover operable to move the combine over a ground surface,
a user interface configured to be engaged by a user and configured to send and receive signals,
a feeder house defining a center line; and
a harvesting platform connected to the combine for movement with the combine over the ground surface, the harvesting platform including
a cutter bar configured to cut a crop being harvested,
a reel configured to press the crop against the cutter bar during harvesting, the reel moveable between a reel harvesting position and a reel transport position,
a gauge wheel configured to engage the ground surface as the harvesting platform moves over the ground surface, the gauge wheel moveable between a gauge wheel harvesting position and a gauge wheel transport position,
a first section connected to the combine, the first section having a first side and a second side opposite the first side, the first section extending along a first section plane that is substantially parallel to the ground surface;
a second section connected to the first side of the first section, the second section being rotatable with respect to the first section within a range of angular positions; and
a locking mechanism configured to retain the second section in a position with respect to the first section while the locking mechanism is activated, and configured to permit movement of the second section with respect to the first section while the locking mechanism is deactivated; and
a controller configured to
receive a first signal from the user interface, send a second signal to the reel to move the reel between the reel harvesting position and the reel transport position in response to the first signal, send a third signal to the gauge wheel to move the gauge wheel between the gauge wheel harvesting position and the gauge wheel transport position in response to the first signal, receive a fourth signal indicative of the position of the second section, and send a fifth signal to the locking mechanism to deactivate the locking mechanism in response to the position of the second section being at a positive non-parallel angle with respect to the first section plane.

8. The harvester of claim 7, wherein the controller is configured to receive a sixth signal from the reel indicative of a current reel position prior to sending the second signal to the reel, such that if the sixth signal indicates that the reel is in the reel harvesting position, the second signal instructs the reel to move to the reel transport position and if the sixth signal indicates that the reel is in the reel transport position, the second signal instructs the reel to move to the reel harvesting position.

9. The harvester of claim 8, wherein the controller is further configured to send a seventh signal to the cutter bar to move the cutter bar between a cutter bar harvesting position and a cutter bar transport position in response to the first signal, and receive an eighth signal from the cutter bar indicative of a current cutter bar position prior to sending the seventh signal to the cutter bar, such that if the eighth signal indicates that the cutter bar is in the cutter bar harvesting position, the seventh signal instructs the cutter bar to move to the cutter bar transport position and if the eighth signal indicates that the cutter bar is in the cutter bar transport position, the seventh signal instructs the cutter bar to move to the cutter bar harvesting position.

10. The harvester of claim 7, wherein the second section is configured to move toward the first section plane in response to gravity while the locking mechanism is deactivated.

11. The harvesting platform of claim 10, wherein the range of angular positions is a first range of angular positions, the locking mechanism is a first locking mechanism, and the position is a first position, the harvesting platform further including a third section connected to the second side of the first section, the third section being rotatable with respect to the first section within a second range of positions, and a second locking mechanism configured to retain the third section in a second position with respect to the first section while the second locking mechanism is activated and configured to permit movement of the third section with respect to the first section while the second locking mechanism is deactivated, wherein the controller is further configured to receive a sixth signal indicative of the second position and configured to send a seventh signal to the second locking mechanism to deactivate the second locking mechanism in response to the second position being at a positive non-parallel angle with respect to the first section plane, and wherein the third section is configured to move toward the first section plane in response to gravity while the second locking mechanism is deactivated.

12. The harvesting platform of claim 11, wherein the controller is configured to send an eighth signal to the first locking mechanism to activate the first locking mechanism and to send a ninth signal to the second locking mechanism to activate the second locking mechanism in response to an operator selecting a transport operation of the combine, wherein the controller is configured to continue sending the eighth signal to the first locking mechanism to maintain activation of the first locking mechanism in response to the first position being at a negative non-parallel angle with respect to the first section plane, and is configured to continue sending the ninth signal to the second locking mechanism to maintain activation of the second locking mechanism in response to the second position being at a negative non-parallel angle with respect to the first section plane, and wherein the controller is configured to continue sending the eighth signal to the first locking mechanism to activate the first locking mechanism in response to the first position being substantially parallel to the first section plane, and is configured to continue sending the ninth signal to the second locking mechanism to activate the second locking mechanism in response to the second position being substantially parallel to the first section plane.

13. The harvesting platform of claim 7, wherein the locking mechanism includes a cylinder, an accumulator and a valve fluidly positioned between the cylinder and the accumulator, and wherein while the locking mechanism is activated, the valve is closed to inhibit fluid flow between the cylinder and the accumulator, and while the locking mechanism is deactivated, the valve is opened to permit fluid flow from the cylinder to the accumulator.

14. A control system for a harvester having a combine, a prime mover operable to move the combine over a ground surface, a cutter bar configured to cut a crop being harvested, a reel configured to press the crop against the cutter bar during harvesting, the reel moveable between a reel harvesting position and a reel transport position, and a gauge wheel configured to engage the ground surface as the harvesting platform moves over the ground surface, a feeder housing defining a center line, a first section connected to the combine, the first section having a first side and a second side opposite the first side, the first section extending along a first section plane that is substantially parallel to the ground surface, a second section connected to the first side of the first section, the second section being rotatable with respect to the first section within a range of angular positions, and a locking mechanism configured to retain the second section in a position with respect to the first section while the locking mechanism is activated, and configured to permit movement of the second section with respect to the first section while the locking mechanism is deactivated, the control system comprising:

a user interface configured to be engaged by a user and configured to send and receive signals, the user interface including a single input device operable to move the reel; and a controller configured to receive a first signal from the single input device of the user interface, receive a second signal from the reel indicative of a current reel position, when the second signal indicates that the reel is in the reel harvesting position, the controller is configured to send a third signal to instruct the reel to move to the reel transport position in response to the first signal, when the second signal indicates that the reel is in the transport position, the controller is configured to send a fourth signal to instruct the reel to move to the reel harvesting position in response to the first signal, receive a fifth signal indicative of the position of the second section, and send a sixth signal to the locking mechanism to deactivate the locking mechanism in response to the position of the second section being at a positive non-parallel angle with respect to the first section plane.

15. The control system of claim 14, wherein the controller is further configured to receive a seventh signal from the gauge wheel indicative of a current gauge wheel position, when the seventh signal indicates that the gauge wheel is in a gauge wheel harvesting position, the controller is configured to send an eighth signal to the gauge wheel to instruct the gauge wheel to move to a gauge wheel transport position in response to the first signal, and when the seventh signal indicates that the gauge wheel is in the gauge wheel transport position, the controller is configured to send a ninth signal to the gauge wheel to instruct the gauge wheel to move to the gauge wheel harvesting position in response to the first signal.

16. The control system of claim 14, wherein the second section is configured to move toward the first section plane in response to gravity while the locking mechanism is deactivated.

17. The harvesting platform of claim 1, wherein the second section is configured to move toward the first section plane in response to gravity while the locking mechanism is deactivated.

18. The harvesting platform of claim 2, wherein prior to sending the second signal, the controller is configured to receive a seventh signal from the cutter bar indicative of a current cutter bar position, such that if the seventh signal indicates that the cutter bar is in the cutter bar harvesting position, then the second signal instructs the cutter bar to move to the cutter bar transport position and if the seventh signal indicates that the cutter bar is in the cutter bar transport position, then the second signal instructs the cutter bar to move to the cutter bar harvesting position.

19. The harvester of claim 3, wherein prior to sending the sixth signal, the controller is configured to receive a seventh signal from the gauge wheel indicative of a current gauge wheel position, such that if the seventh signal indicates that the gauge wheel is in the gauge wheel harvesting position, then the sixth signal instructs the gauge wheel to move to the gauge wheel transport position and if the seventh signal indicates that the gauge wheel is in the gauge wheel transport position, then the sixth signal instructs the gauge wheel to move to the gauge wheel harvesting position.

20. The harvester of claim 8, wherein prior to sending the third signal, the controller is configured to receive a seventh signal from the gauge wheel indicative of a current gauge wheel position, such that if the seventh signal indicates that the gauge wheel is in the gauge wheel harvesting position, then the third signal instructs the gauge wheel to move to the gauge wheel transport position and if the seventh signal indicates that the gauge wheel is in the gauge wheel transport position, then the third signal instructs the gauge wheel to move to the gauge wheel harvesting position.

* * * * *